United States Patent [19]

Cummins et al.

[11] Patent Number: 5,361,376
[45] Date of Patent: Nov. 1, 1994

[54] KEYBOARD AND CONTROLLER WITH A THREE WIRE HALF DUPLEX ASYNCHRONOUS AND BIDIRECTIONAL COMMUNICATIONS ARCHITECTURE

[75] Inventors: Dennis A. Cummins; Wayne R. Hucaby, both of Raleigh, N.C.

[73] Assignee: International Business Machine Corporation, Armonk, N.Y.

[21] Appl. No.: 203,831

[22] Filed: Feb. 28, 1994

Related U.S. Application Data

[63] Continuation of Ser. No. 667,857, Mar. 12, 1991, abandoned.

[51] Int. Cl.⁵ .............................................. G06F 11/00
[52] U.S. Cl. .................................. 395/800; 395/275; 364/DIG. 1; 364/234; 364/228; 364/238.3
[58] Field of Search ................ 395/800, 275, 325, 550

[56] References Cited

U.S. PATENT DOCUMENTS

| | | | |
|---|---|---|---|
| 4,460,957 | 7/1984 | Eggebrecht et al. | 364/200 |
| 4,482,955 | 11/1984 | Amano et al. | 364/200 |
| 4,609,908 | 9/1986 | Amano | 340/365 S |
| 4,942,606 | 7/1990 | Kaiser et al. | 380/4 |
| 5,056,057 | 10/1991 | Johnson et al. | 364/900 |
| 5,125,080 | 6/1992 | Pleva et al. | 395/325 |
| 5,146,584 | 9/1992 | Christensen | 395/550 |
| 5,214,785 | 5/1993 | Fairweather | 395/800 |

OTHER PUBLICATIONS

EIA Standard Electronic Industries Association, Jan. 1987; pp. 20 and 28–29.
Mini–Micro Systems, vol. XX, No. 11, Nov. 1987, Netown, Mass. US pp. 65–66.
Anon: "Focus on Apple Part IV–The Apple Desktop Bus" IBM Technical Disclosure Bulletin, vol. 31, No. 12, May 1989, Armonk, N.Y., US pp. 228–231.
Anon: "Simplified Asynchronous Communications Interface Network".

*Primary Examiner*—Alyssa H. Bowler
*Assistant Examiner*—Mehmet Geckil
*Attorney, Agent, or Firm*—Joscelyn G. Cockburn

[57] ABSTRACT

A controller and communications architecture for controlling the operation of computer I/O devices such as a keyboard or the like includes two microprocessors, a three-wire half duplex communications interface and a transmission protocol allow data transmission, error, detection and contention resolution. The transmission protocol allows the microprocessors to transmit serial data over the interface which includes a single shared data line and two simplex clock lines.

8 Claims, 11 Drawing Sheets

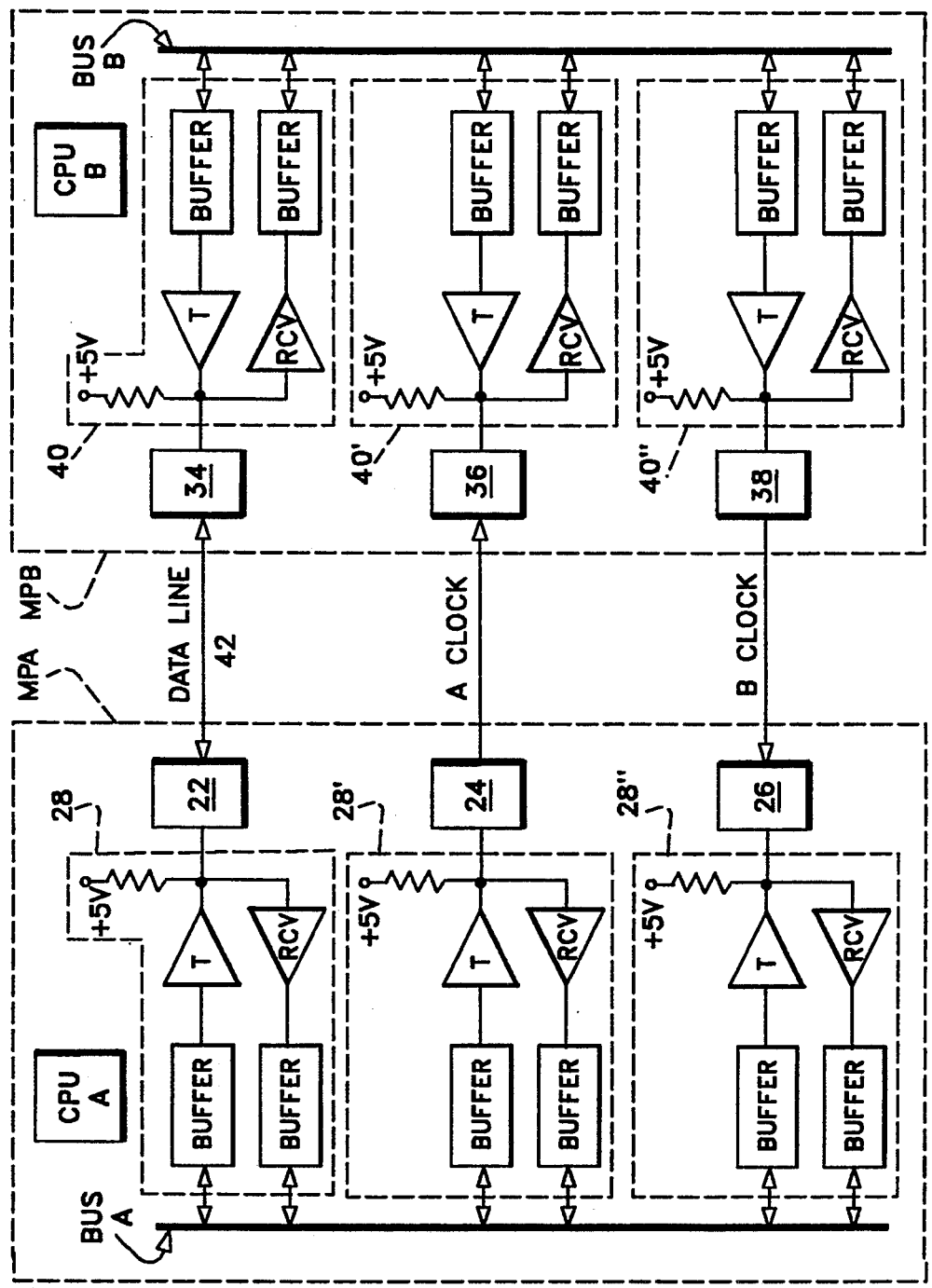

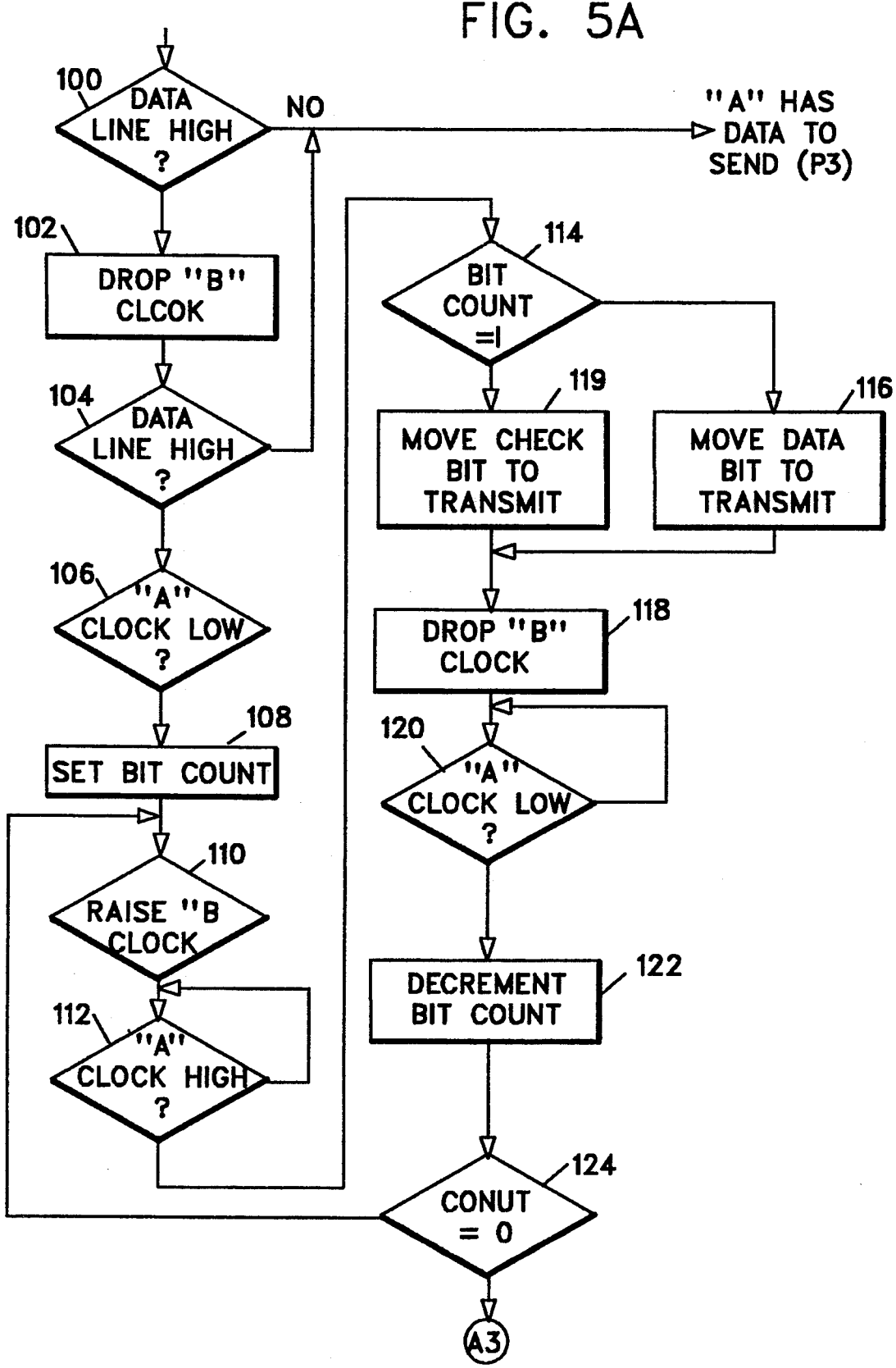

KEYBOARD AND CONTROLLER WITH A THREE WIRE HALF DUPLEX ASYNCHRONOUS AND BIDIRECTIONAL COMMUNICATIONS ARCHITECTURE

This is a continuation of application Ser. No. 07/667,057 filed Mar. 12, 1991, now abandoned.

BACKGROUND OF THE INVENTION

1. Field of the Invention

The invention relates to microprocessors in general and in particular, to their use as device controllers and interfaces for interconnecting the microprocessors.

2. Prior Art

The proliferation of personal computers (PCs), word processors, point of sale terminals (electronic cash registers), data terminal equipment (DTE) and the like have created a need for more efficient and faster Input-/Output (I/O) devices. A conventional computer based terminal includes a control unit including a master microprocessor and different types of I/O devices coupled over appropriate communications lines or other medium to the control unit. Some of the well known I/O devices include keyboards, scanners, cathode my tubes (CRTs), etc.

The I/O devices form an interface between an operator (user) and the control unit. In this regard, the input device performs a physical act or undergoes a physical transformation to generate data which is packaged as messages and forwarded to the control unit for further processing. When the processing is completed, the control unit transmits the result to the output device which ultimately delivers the result to the operator or other user. For example, in case of a keyboard, the operator inputs data by activating selected keys. A control section of the keyboard monitors the keys and, as a character is depressed, an electronic representation of the depressed key is generated and forwarded to the main processor for further processing. Similarly, in the case of a scanner, information is scanned and electronic representations of the scanned information are generated and forwarded to the main processor for additional processing.

Broadly speaking, a typical input device has a structure to receive input information, a structure (usually electrical) to generate electrical representations of the input information and a communications interface including communications protocol for exchanging the information between the input device and the main processor of the control unit. In the case of a keyboard, the structure which receives input information includes the keys which the user activates to generate a desired document, etc. In the case of a scanner, the optical beam scans an input document or code and generates an electrical image which is subsequently forwarded to a master unit for further processing.

The prior art abounds with typical input devices. For example, U.S. Pat. No. 4,617,554 describes a multi-key electronic keyboard in which a keyboard processor scans the key to detect which ones are depressed, generates a character code representative of the depressed keys and forwards the code to a master CPU for further processing.

U.S. Pat. No. 4,706,068 discloses an interface structure for communicating between a keyboard and its terminal. The structure has a microprocessor in the terminal, four-wire interface at the keyboard and four wires interconnecting the keyboard and the terminal. The signals which are exchanged between the terminal and the keyboard include a keyboard initialize signal, a keyboard increment signal and a data signal. The initialize signal and increment signal are transmitted from the terminal to prime the keyboard to transmit data over the data line.

U.S. Pat. No. 4,766,418 discloses a keyboard wherein the keys of a "Qwerty" section are scanned by a first micro computer control circuit and the keys of a system select section are scanned by a second micro computer control circuit. The first microprocessor sends coded data representative of depressed "Qwerty" keys to the second microprocessor which, in turn, sends the coded data to the terminal. The second microprocessor also sends coded data representative of depressed system selection keys to the terminal. A data bus and an interrupt line and a control bus interconnect the two processors. In addition, a multiplicity of control lines interconnect the second micro computer to a "universal asynchronous receiver and transmitter" (UART) which interconnects the keyboard to the terminal.

Another prior art technique used for interprocessor communication is the well known "RS232" interface. The RS232 interface is a serial interface. However, the interface requires a plurality of hand shaking signals to be exchanged between the communicating devices prior to sending data on the communications line. A plurality of interconnecting control lines are required to transmit the hand shaking signals.

Even though the prior art devices and techniques work well for their intended purposes, each one is deficient in some aspect. The main areas of deficiencies are the controllers themselves and the communications method used to exchange information between microprocessors. Regarding the communications method, a relatively large number of ports or pins are required in order to provide control lines on which the hand shaking signals are transmitted. This creates unnecessary hardships where the controller is a microprocessor with a limited number of I/O pins. In addition, the hand shaking routine results in unnecessary overhead, with reduced system throughput. The controllers include cumbersome wire interfaces communicating with its terminal microprocessors or even if microprocessors are in the keyboards, their effectiveness is hampered by cumbersome communications protocols.

SUMMARY OF THE INVENTION

It is, therefore, the object of the present invention to provide a more efficient I/O device controller.

It is another object of the present invention to provide an improved and more efficient communications interface for interprocessor communication.

It is still another object of the present invention to provide an efficient protocol and technique for interprocessor communications.

The controller includes two microprocessors (A and B) interconnected by a shared data line and two simplex unidirectional clock lines. Each of the microprocessors executes a program which allows the microprocessors to send serial data over the data line. The programs provide routines that resolve contention between processors requesting simultaneous use of the data lines and return a positive acknowledgement of the received data. The communication protocol is such that when microprocessor A wishes to communicate with microprocessor B, microprocessor A lowers the data line which is normally high. Microprocessor B detects the low data line and interprets it as an indication that. A is ready to send. When B is ready to receive, B lowers the B clock line (BCLK). A then lowers the A clock line (ACLK) indicating the start bit is valid. B raise the BCLK acknowledging the receipt of the start bit. A raises the ACLK and waits for B to request data. B lowers the BCLK when it is ready for data. A then places the first data bit on the data line and lowers ACLK. B receives the data bit and raises BCLK. A raises ACLK. When B is ready for another bit, B lowers the BCLK indicating a request for data. A places the data on the data line and lowers ACLK. B receives the data and raises BCLK. A raises ACLK. This process continues until the last data bit (n) has been received.

After the data has been sent from A to B, A releases the data line. This is an invitation to B to send a positive acknowledgement. B processes the received data using a suitable checking method such as parity or CRC. B places good (low) or bad (high) status on the data line and lowers BCLK. A receives the data and lowers ACLK. B raises BCLK and releases the data line. A raises ACLK.

Note that if the receiver, B, has lost synchronization, it will either not lower BCLK asking for another bit or it will not lower the data line to a "good" positive acknowledgement. Either will indicate an error to A.

When sending data from B to A, the same clock timings are used. B checks the data line to ensure that it is high (A is not requesting to send) and lowers BCLK. A detects the low BCLK and interprets this as a ready to send indication from B. When A is ready to receive, it lowers ACLK indicating the receipt of the start bit. B raises BCLK. A raises ACLK. B places the first data bit on the data line and lowers BCLK. A detects the low BCLK and reads the data bit. When the data has been received, A lowers ACLK. B raises BCLK. A raises ACLK. This process continues until the last bit has been sent. B releases the data line and lowers BCLK. This is an invitation to A to send a positive acknowledgement. A places the good (low) or bad (high) indication on the data line and lowers ACLK. B receives the acknowledgement and raises BCLK. A releases the data line and raises ACLK.

When the two microprocessors contend for a shared resource (the data line), one of the devices will have a higher priority. This communications architecture is designed to give priority to the A device.

When both A and B try to send data concurrently, A will lower the data line and B will lower BCLK. This will appear to A as a response from B requesting data. A will lower ACLK. B will detect the low data line and recognize tiffs as a start bit from A. Therefore, B will receive data rather than send data.

The foregoing and other features and advantages of the invention will be more fully described in the accompanying drawings.

BRIEF DESCRIPTION OF THE DRAWINGS

FIG. 2 shows a more detailed block diagram of the controller and the interconnecting interface.

FIGS. 5A and 5B show a flow chart of the program executed in another microprocessor when it is sending data.

DETAILED DESCRIPTION OF THE PREFERRED EMBODIMENT

The invention to be described hereinafter can be used in different types of computer I/O devices. It works well in a keyboard and, as such, will be described in that environment. However, this should not be construed as a limitation upon the scope of the invention since it is well within the skill of one skilled in the art to make minor changes to the described invention and use it in several other types of I/O devices and communications networks.

Figure 1:
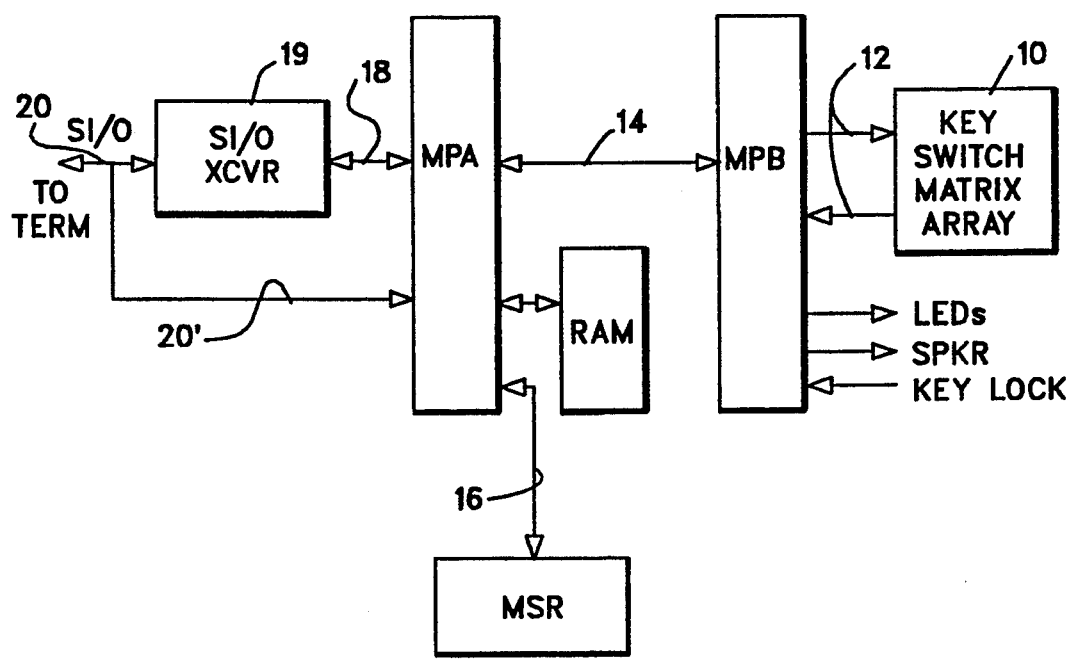
FIG. 1 shows a block diagram of a keyboard and the improved controller according to the present invention.

FIG. 1 shows a block diagram of a keyboard including the teachings of the present invention. The keyboard includes a key switch matrix array 10 interconnected over communications line 12 to a microprocessor B labeled MPB. The MPB is connected over the appropriate communications line to a group of LEDs used to indicate the status of the keyboard, a speaker (SPKR), and a manager key lock which is generally available on a point of sale terminal. MPB is connected over interface communication means 14 (details to be given hereinafter) to microprocessor A (MPA). MPA is coupled over bidirectional communication lines 16 to a magnetic stripe reader (MSR). The magnetic stripe reader scans a card carrying a magnetic code and generates a coded signal which is forwarded over communications line 16 to MPA for further processing. The MPA is connected by communications line 18 to a serial I/O (SI/O) transceiver (XCVR) which, in turn, is coupled by a serial I/O cable 20 to a terminal (not shown). The terminal, not shown, is also coupled by SI/O cable 20' to the MPA. The serial I/O transceiver 19 is an off-the-shelf item which includes a receiver for receiving serial data from SI/O cable 20 and a transmitter for transmitting data to the terminal on SI/O cable 20. The serial I/O transceiver is a well known communication device and further details of its structure will not be given. It should be noted that by providing a serial I/O transceiver between MPA and the terminal and a SI/O cable 20' between the terminal and MPA, the keyboard could be plugged into different ports at the terminal where each port supports a different type of keyboard communications protocol.

MPA and MPB are off-the-shelf microprocessors. In an embodiment of the present invention, the Intel 8052 microprocessors were used. These microprocessors are provided with internal RAM and prestored programs in their respective ROS which forces them to perform certain general functions. By writing additional operating programs using the instruction set of each processor, the microprocessors are made to operate in the manner to be described hereinafter and provide a superior controller which could be used in keyboards and other I/O devices. In an embodiment of the present invention, the MPA is the master processor. It controls communication to the terminal, handles MSR read and decode, and controls communication with the MPB which is operating as a slave processor. The MPB, on the other hand, scans the key switch matrix array 10, manages switch debouncing, scans code generation, roll over handling, typeamatic handling, fat finger handling, indicator LED handling, speaker handling, manager key lock handling and communications with the master processors (MPA). It should be noted that characterizing MPA as a master processor and MPA as a slave processor is only done so as to simplify the description of the invention and should not be construed as a limitation on the scope of the present invention.

FIG. 2 shows a more detailed block diagram of the controller according to the teachings of the present invention. The controller includes MPA and MPB interconnected by transmission communications means 14 (details of which will be given hereinafter). MPA includes bidirectional data port 22, unidirectional data port 24 and unidirectional data port 26. Bidirectional data port 22 transmits data bidirectionally while unidirectional control port 24 transmits data in a single direction and unidirectional control port 26 only receives data. The bidirectional data port 22, unidirectional control ports 24 and 26 are connected by circuit arrangement 28, 28' and 28" to bus A of CPU A.

The structure and configuration of circuit arrangement 28, 28' and 28" are identical, therefore, only one of the circuit arrangements (circuit arrangement 28) will be described, it being understood that the other circuit arrangements (28' and 28") function in a way identical to that of circuit arrangement 28. The circuit arrangement 28 couples bidirectional data port 22 to bus A of CPU A. Circuit arrangement 28 includes a transmitter (T) and a receiver (RCV) dot ORed and connected by resistor (R) to a +5 voltage level. The output of the receiver is connected to buffer means 30. Similarly, the input to the transmitter (T) is coupled to buffer means 32. The transmitter (T) and receiver (RCV) are off-the-shelf items and details will not be given. When CPU A needs to transmit data to the bidirectional port 22, the information is placed over bus A into buffer 32 and is transmitted by the bidirectional port 22. Similarly, when CPU A is to receive data, the data is transmitted to bidirectional port 22 through the receiver into buffer means 30 and over bus A to CPU A. The programs for managing the CPU A will be given hereinafter. Because of the configuration shown in the figure, when CPU A is not transmitting data on bidirectional port 22 or any of the other ports, the ports float high since it is tied through a resistance R to a positive voltage level. It should be noted that for the unidirectional control port 24, the buffer which is connected to the receiver is not read by CPU A. In this way, only information which is transmitted From the MPA is available at unidirectional port 24. Likewise, on unidirectional port 26, only the buffer which is connected to the receiver is used. However, both unidirectional ports 24 and 26 are floated high when the lines (to be described hereinafter) are not activated by a respective microprocessor.

Still referring to FIG. 2, microprocessor B (MPB) has a structure and configuration similar to that of MPA. This being the case, only the functional component of MPB will be identified. It being understood that the functional components operate in the exact manner as similar functional components in the MPA which have been previously described. To this end, MPB includes bidirectional data port 34, unidirectional control port 36 and unidirectional control port 38. Each of the ports 34, 36 and 38 are coupled through circuit arrangements 40, 40' and 40" to bus B of CPU B. The structure and operation of the ports and the circuit arrangements in MPB are similar to like components described in MPA. Therefore, a detailed description of the named elements in MPA will not be give. Suffice it to say that circuit arrangements 40, 40' and 40" float the ports 34, 36 and 38 high when the program in CPU B does not provide a signal on one of tile respective ports. When an appropriate signal is provided on the port, the port is forced to a low state. As is used in this document "float high" simply means that a plus voltage is on the respective port. Similarly, "low" or "drops" indicates that the voltage on the respective port is near zero.

Still referring to FIG. 2, MPA and MPB are interconnected at bidirectional data ports 22 and 34 by bidirectional data line 42. Unidirectional control ports 24 and 36 are interconnected by unidirectional line labeled A clock. The arrow on the line indicates the direction in which control information flows. In essence, only A can place information (clock pulses) on the A clock line. Similarly, unidirectional control port 26 is interconnected to unidirectional control port 38 by a control communications line labeled B clock. Only MPB can place control information (B clock) on the communications lines labeled B clock. Preferably, the interconnecting lines are printed copper lands or the like.

Figure 6:
FIG. 6 shows the message format.

FIG. 6 shows a graphical representation of the message format or structure which is transmitted on data line 42 (FIG. 2). As will be explained subsequently, data is exchanged between MPA and MPB on data line 42 while control or clocking information is exchanged on the A and B clock lines, respectively. The message former includes a start Start (S) bit field, and information field comprising a plurality of bits, a status (STA) bit field indicating the character of the data in the information field and a parity (P) bit field for checking the accuracy of received information. It should be noted that a CRC polynomial could be used in the P field to check tile accuracy of the data.

Included in the information which can be exchanged between MPA and MPB is commands which MPA could forward to MPB, a scan code byte which MPB could transfer to MPA and a status byte from MPB to MPA. Table I below shows the command byte structure. The table identifies the bit and the function which each bit serves. The parity bit is calculated by making the eighth command bit plus the parity bit have a odd parity of ones (odd parity). The start bit is not included in the parity calculation.

TABLE I

| MPA to MPA Command Byte Definition | |
|---|---|
| BIT | FUNCTION |
| 1 | Start Bit (always = '0') |
| 2 | Command bit 0 (lsb) |
| 3 | Command bit 1 |
| 4 | Command bit 2 |
| 5 | Command bit 3 |
| 6 | Command bit 4 |
| 7 | Command bit 5 |
| 8 | Command bit 6 |
| 9 | Command bit 7 (msb) |
| 10 | Parity bit (odd parity) |

Table II shows the scan code byte structure which is transmitted from MPB to CPU A. This table identifies the bits and the function which each bit provides.

TABLE II

| | MPB to MPA Scan Code Byte Definition |
|---|---|
| BIT | FUNCTION |
| 1 | Start Bit (always = '1') |
| 2 | Data/Status |
| | '0' = Data (scan code) follows |
| 3 | Scan code bit 0 (lsb) |
| 4 | Scan code bit 1 |
| 5 | Scan code bit 2 |
| 6 | Scan code bit 3 |
| 7 | Scan code bit 4 |
| 8 | Scan code bit 5 |
| 9 | Scan code bit 6 |
| 10 | Scan code bit 7 (msb) |
| 11 | "Fat-Finger" bit (indicates that this scan code and the previous/following scan code were "fat-fingered") |
| 12 | Parity bit (odd parity) |

Finally, Table III shows a status byte structure which is transmitted from MPB to MPA. The table identifies each bit and the function which the bit provides.

TABLE III

| | MPB to MPA Status Byte Definition |
|---|---|
| BIT | FUNCTION |
| 1 | Start Bit (always = '1') |
| 2 | Data/Status |
| | '1' = Bits 3-10 are status or EC level not scan codes |
| 3 | Status/EC |
| | '0' = Bits 4-10 of this message are slave processor status, as defined below |
| | '1' = Bits 4-10 of this message are the slave processor's EC level (from 0-128), not the status bits that are defined below |
| 4 | Keyboard Enable State |
| | '0' = Keyboard disabled |
| | '1' = Keyboard enabled |
| 5 | Key Lock Status |
| | '0' = Key Lock off |
| | '1' = Key Lock on |
| 6 | Tone Status |
| | '0' = Tone inactive or in progress |
| | '1' = Tone complete |
| 7 | Command Accept/Reject |
| | '0' = Last command from master was accepted |
| | '1' = Last command from master was not recognized (re-send command) |
| 8 | (not used) |
| 9 | (not used) |
| 10 | (not used) |
| 11 | Parity bit (odd parity) |

Figure 4A:
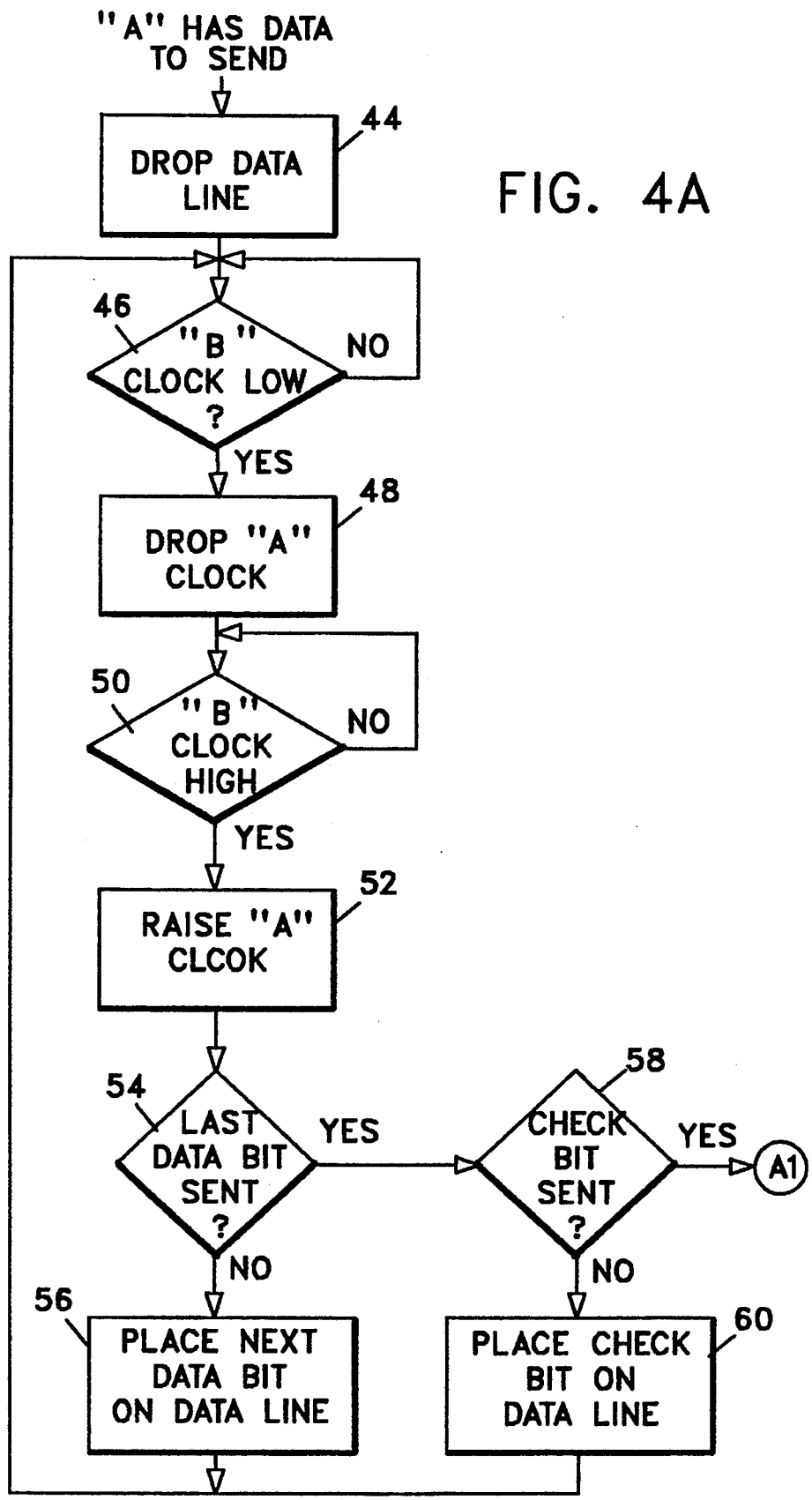
FIGS. 4A and 4B show flow charts of the program executed in one of the microprocessors when it is sending data.
Figure 4B:
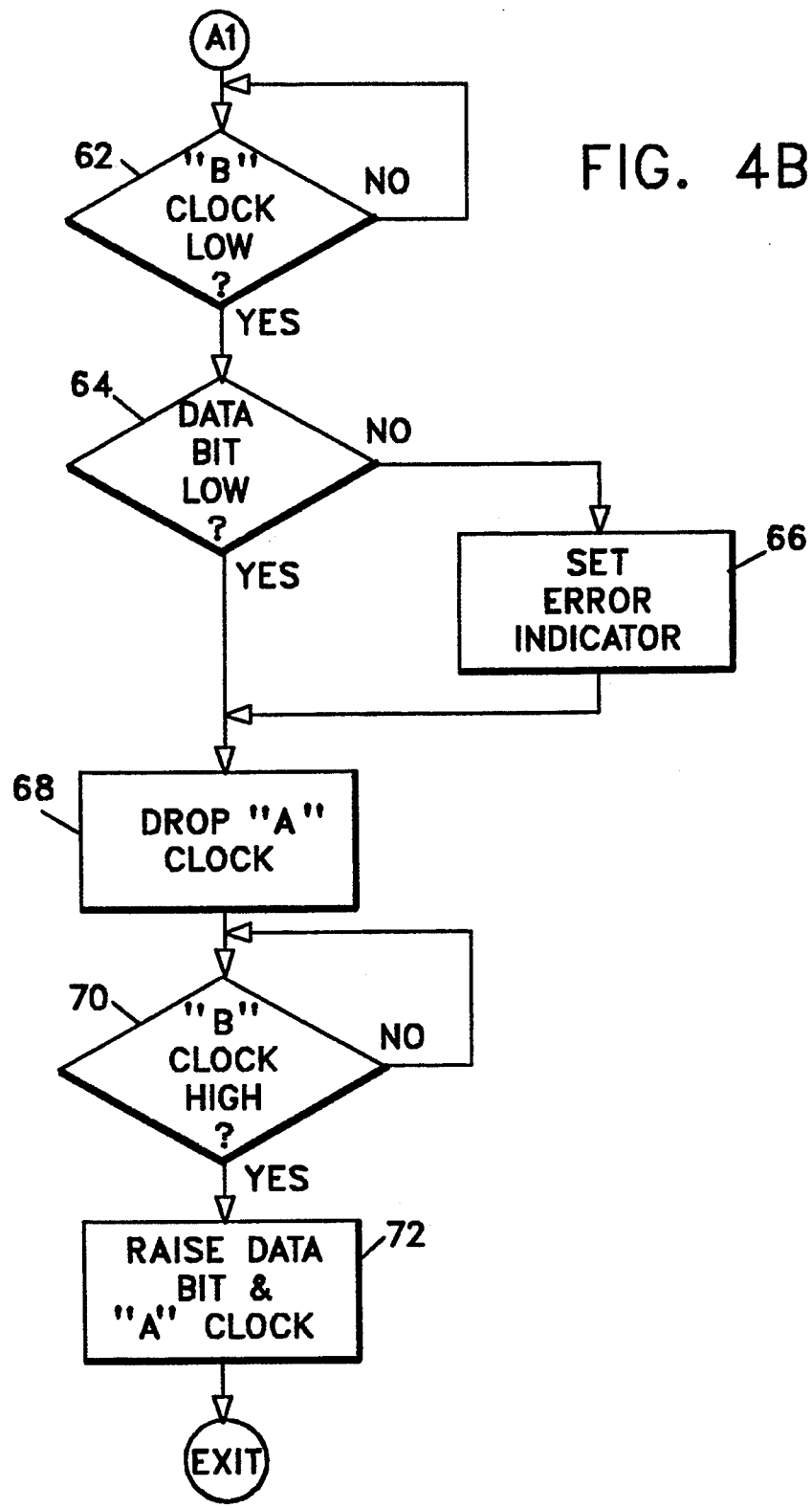

FIGS. 4A and 4B show flow charts for a computer program which is executed in CPU A when MPA has data to send to MPB. With reference to block 44, CPU A drops data line 42 by placing bits in buffer 32 (FIG. 2). The program then descends into decisional block 46. In block 46, CPU A tests B clock line to see if it is low. If it is not, the program goes into a loop and when it becomes low, descends into block 48. In block 48, CPU A drops "A" clock line and descends into decisional block 50. It should be noted that processor A dropping the A clock line in block 48 signals that the data (start bit) on the data line 42 is valid.

Still referring to FIG. 4A, in decisional block 50, the processor tests the state of "B" clock line. If the state is not high, the program goes into a loop until the state is high whereat the program descends into block 52. When the data line goes high in block 50, this is an indication that CPU B has received a data bit which was on the data line 42. In block 52, processor A raises the "A" clock line. This indicates to processor B that the data bit on the line is not valid. From block 50, the program descends into block 54. In decisional block 54, CPU A checks to see if the last data bit has been transmitted. If it is not the last data bit, the program descends into block 56 where the next bit for transmission is placed on data line 42 and the program branches to block 46 to continue through the above-named process.

Still referring to FIG. 4A, if the last data bit is transmitted (block 54) the program enters decisional block 58 where it checks to see if the bit check informational P was sent. If the bit was not sent, the program descends into block 60 where a check bit is placed on the data line and the program loops back to block 46. It should be noted that the check bit is the parity or CRC sequence which is sent with the information and is used for checking the accuracy of the received data. If the check bit has been sent (block 58), the program exits along the Y path to decisional block 62 (FIG. 4B).

In decisional block 62, the A processor checks the B clock line. If the line is not low, the program goes into a loop until it is low and then descends into decisional block 64. The state of the B clock line in block 62 indicates an (ACK) acknowledgement from processor B (good data) or a NACK (bad data). In block 64, the A processor tests the status of the data bit line. If it is not low, the program descends into block 66 where it sets an error indicator indicating error in the transmitted data. Still referring to block 64, if the data bit is low, the program descends into block 68 where it causes the A clock to drop and descends into block 70. In block 70, the program in the A microprocessor tests the state of the B clock. If it is not high, the program goes into a loop until it becomes high and descends into block 72. In block 72, CPU A raises the data bit line and the A clock line and exits the routine.

Figure 4C:
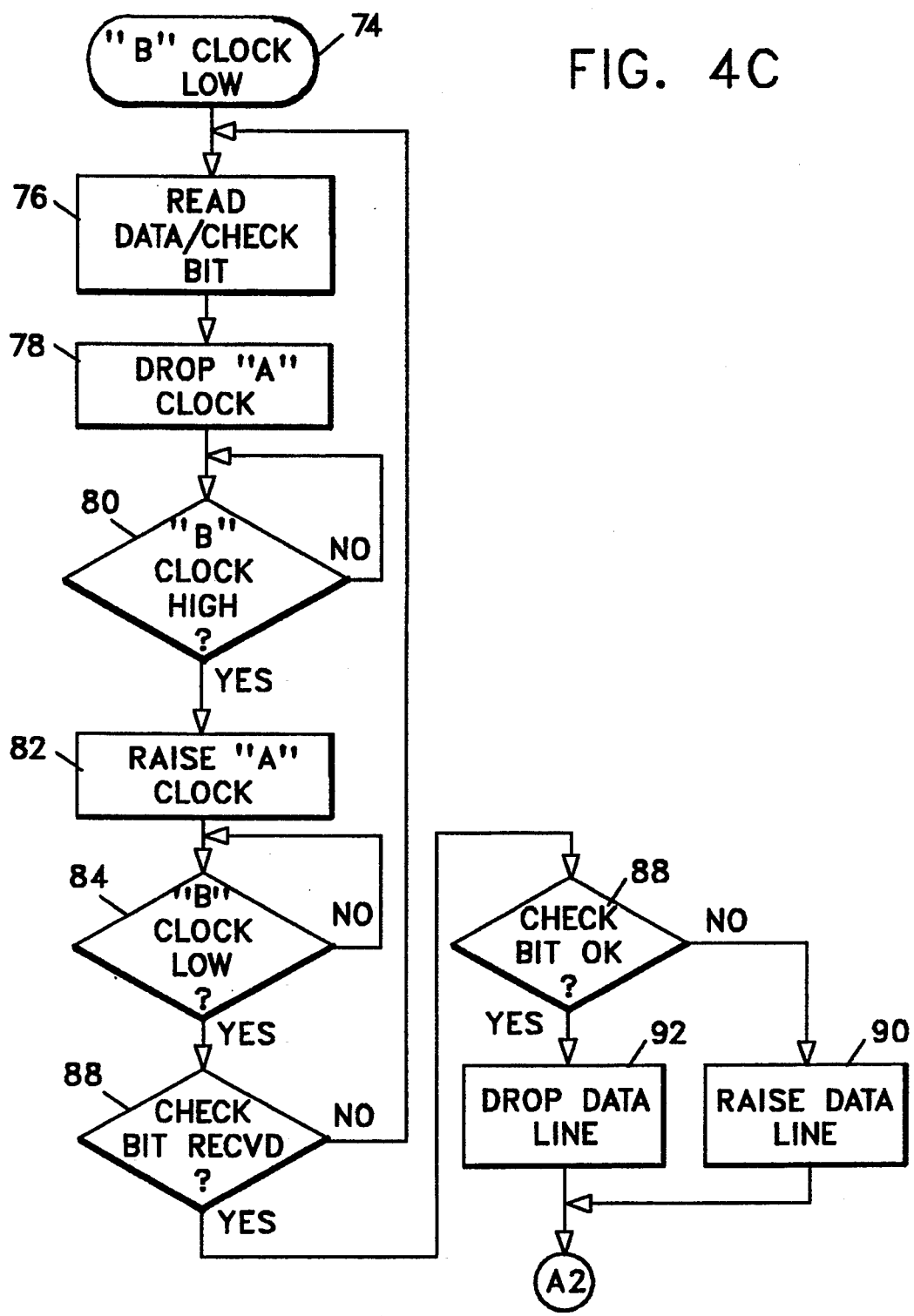
FIGS. 4C and 4D show flow charts of the program executed in said one of the microprocessors when it is receiving data from another microprocessor.
Figure 4D:
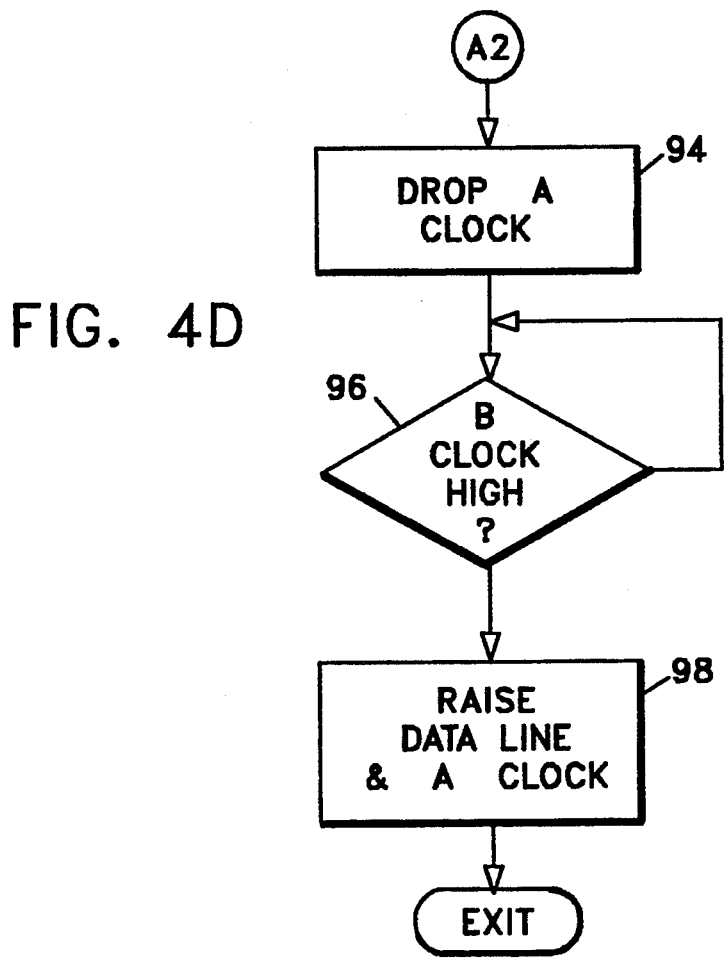

FIGS. 4C and 4D show flow charts for the computer program which is executed in CPU A when MPB has data to send. With reference to block 74 (FIG. 4C), when B has data to send to A, MPB drops the "B" clock line low. This indicates a request to send signal. The program then descends into block 76 where A reads in a data bit. The program then descends into block 78. In block 78, A acknowledges receipt of the data bit by dropping the A clock and descends into decisional block 80. In decisional block 80, A checks the state of the B clock. If the B clock is low, the program goes into a loop until it is forced high, whereupon the program descends into block 82. In block 82, MPA raises the A clock thus indicating that A is ready to receive data from B and descends into decisional block 84. In decisional block 84, CPU A tests the state of B clock. If it is not low, the program goes into a loop until the B clock is low. The program then descends into decisional block 86. In decisional block 86, the program checks to see if A receives the check bit. If the check bit is not received, the program goes into a loop and begins to process the steps previously recited, beginning in block 76.

If the check bit has been received (block 86), the program descends into decisional block 88. In decisional block 88, the program checks to see if the cheek bit is satisfactory. If the check bit is not satisfactory, the program descends into block 90 where the CPU A raises the data line. If the check bit is ok (block 88), the program descends into block 92 where it drops the data line. The program then descends into block 94 (FIG. 4D), where CPU A drops the A clock, thus indicating that the acknowledged bit which was placed on the line is valid. The program then descends into block 96. In block 96, CPU A tests the B clock for its status. If the B clock is not high, the program goes into a loop until it is high, whereupon the program descends into block 98. In block 98, the program forces CPU A to raise the data line and the A clock and exit the program.

Figure 5B:
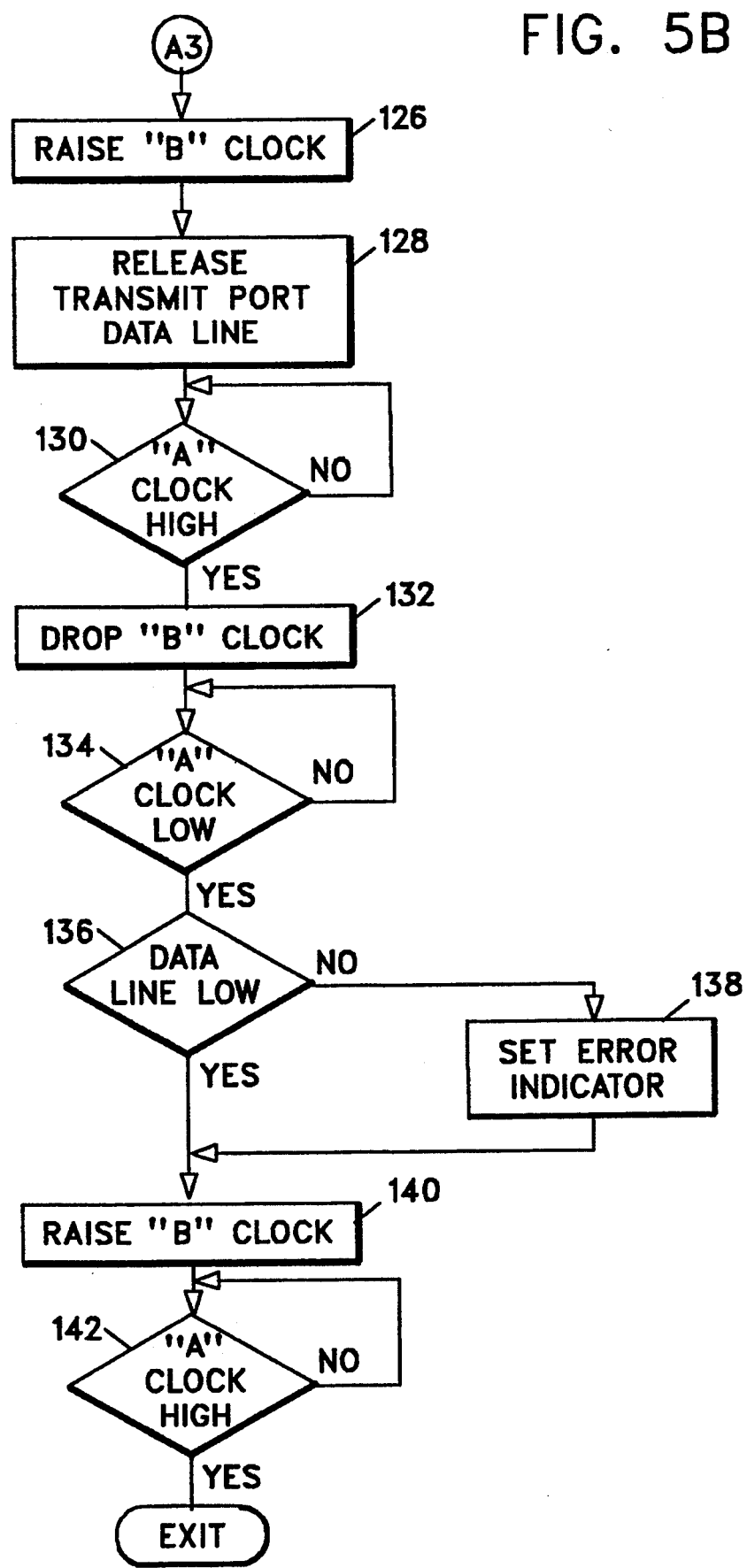

FIGS. 5A and 5B show flow charts for computer programs which are executed in CPU B, when B has data to send to MPA. With reference to FIG. 5A, when B has data to send to A, B tests the status of the data line (block 100). If the data line is low, this indicates that A has data to send and the program branches to FIG. 5C (to be described subsequently). If the data line is high, the program descends into block 102 where the program forces CPU B to drop its clock line. The program then descends into decisional block 104 where it tests the state of the data line. If the data line is not high, the program branches to FIG. 5C. If the data line is high, the program descends into decisional block 106. In block 106, CPU B tests to see the state of the A clock. If the A clock is high, the program goes into a loop and waits until the A clock is forced low and descends into block 108.

In block 108, the program sets bit count for the number of bits it wishes to transmit to CPU A. The program then descends into block 110. In block 110, CPU B raises the B clock which indicates data is not valid and descends into decisional block 112. In decisional block 112, the program in CPU B tests the A clock line. If the line is not high, the program goes into a wait state until the line becomes high and then descends into decisional block 114. In decisional block 114, the program tests the bit count to see if all the data is transmitted. If all the bit has not been transmitted, the program descends into block 116, where it moves a data bit to transmit and descends into block 118. If the desired number of bits has been transferred (block 114), the program descends into block 120 where it moves the check bit (parity) to transmit and descends into block 118. In block 118, CPU B drops the B clock indicating data is valid. The program then descends into decisional block 120 where it checks the status of the A clock. If the A clock is not low, the program waits until it is low and then descends into block 122. In block 122, the program decrements the bit count and descends into decisional block 124 where it branches back to block 110 if the count is not 0 and if the count is 0, descends into block 126 (FIG. 5B).

In block 126 (FIG. 5B), the program causes MPB to raise the B clock which indicates that data is not valid. The program then descends into block 128 where it releases the transmit port and the data line. The program then descends into decisional block 130, where it checks the status of the A clock line. If the A clock line is not high, the program waits until it becomes high and then descends into block 132. In block 132, the program Forces MPB to drop the B clock. The program then descends into decisional block 124 where it checks the status of the A clock. If the A clock is not low, the program waits until the A clock line is low and then descends into decisional block 136. In block 136, the program tests the data line. If the data line is not low, the program descends into block 138 where it sets an error indicator. If the data line is low (block 136), the program descends into block 140 where it raises the B clock line and descends into decisional block 142. In decisional block 142, the program tests the A clock. If the A clock is not high, the program waits until it becomes high and then exits the program.

Figure 5C:
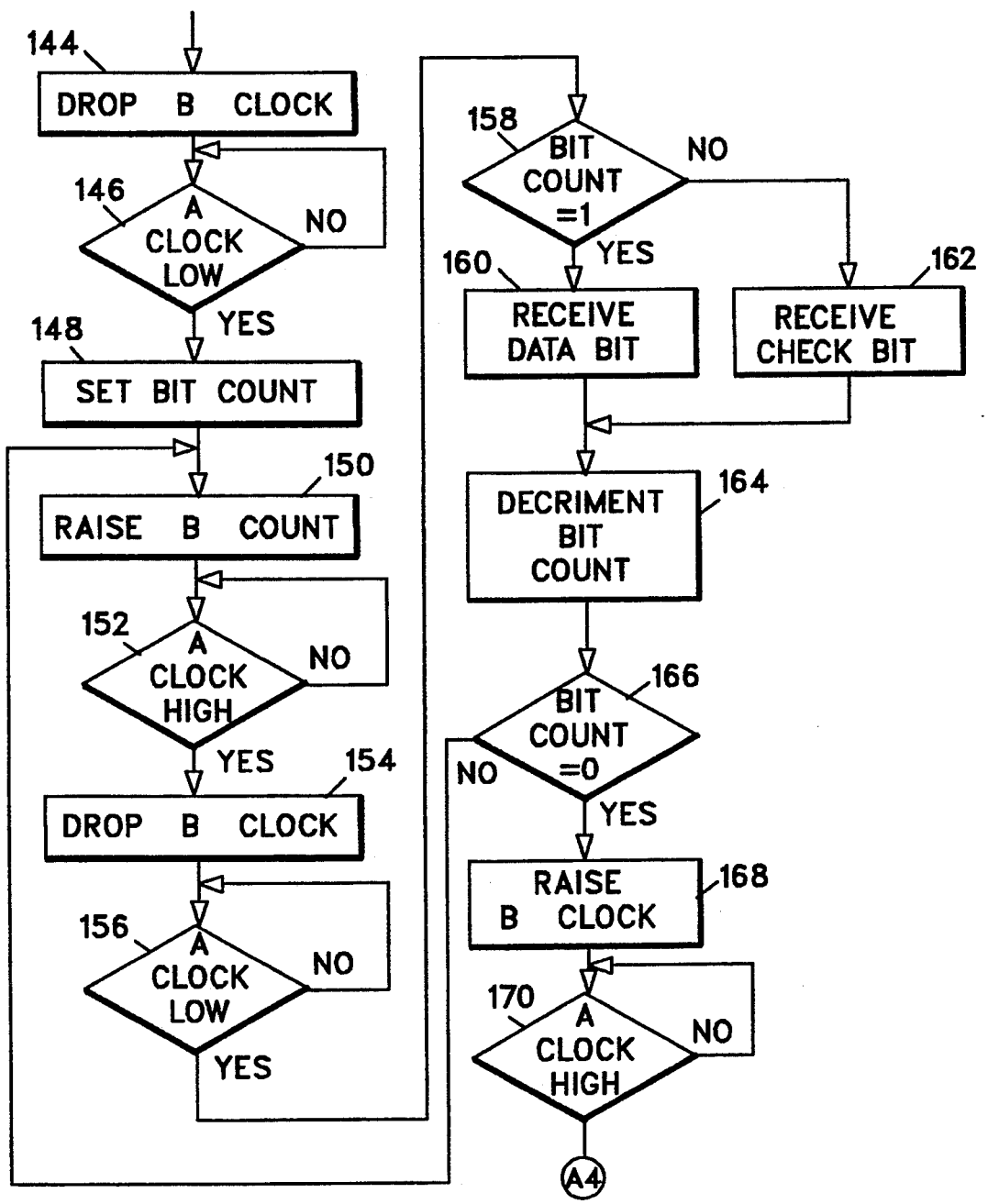
FIGS. 5C and 5D show a flow chart of the program executed in said another microprocessor when it is receiving data.
Figure 5D:
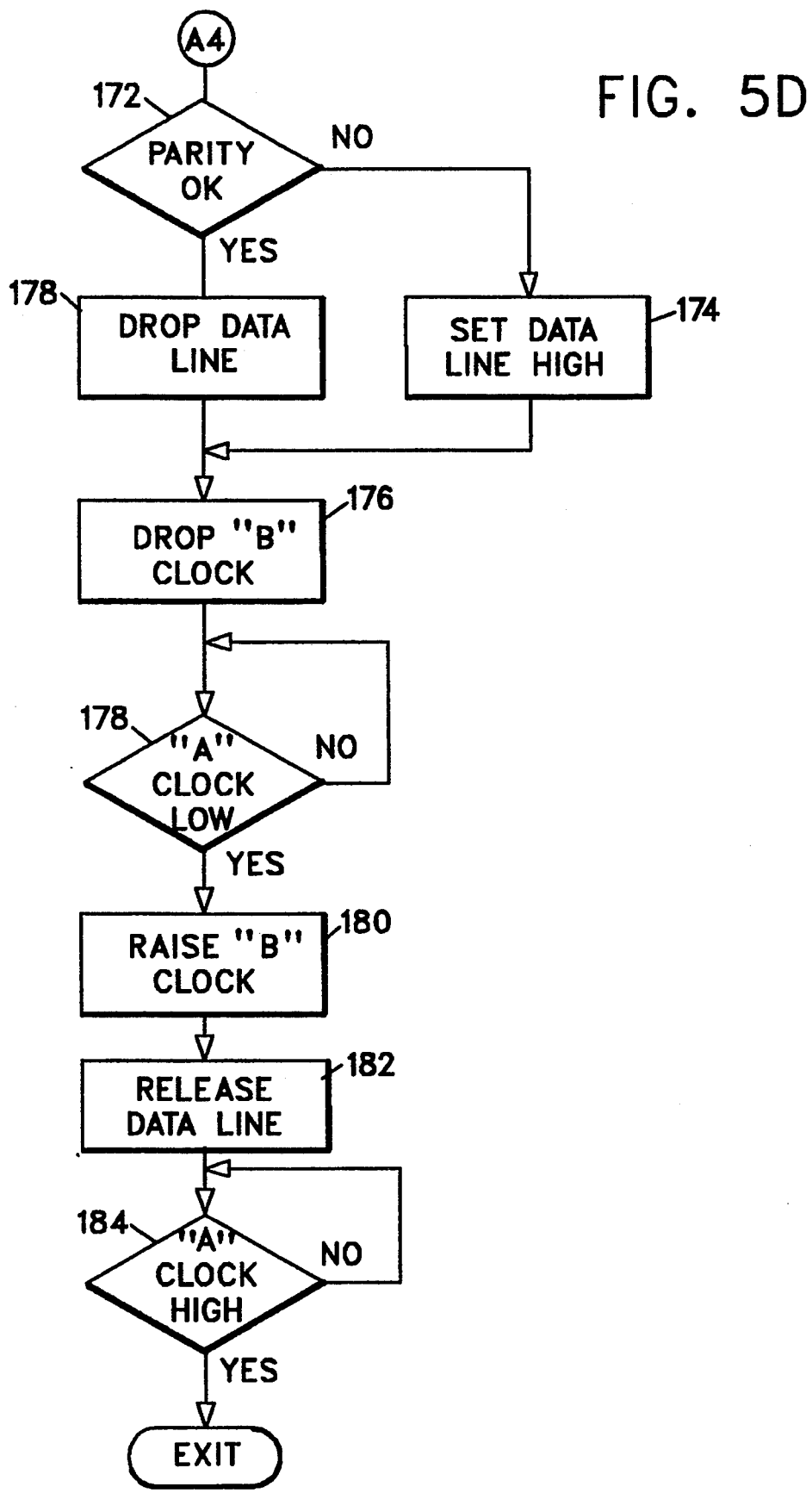

FIGS. 5C and 5D show computer programs that are executed in the CPU B when A has data to send. Referring to FIG. 5C, if A has data to send, which B determines by a change in the data line, B drops the B clock line (block 144). The program then descends into block 146 where it checks the status of the A clock line. If the A clock line is not low, the program waits until it is low and then descends into block 148. In block 148, the program sets the; bit count for the number of bits which it intends to receive from A and descends into block 150. In block 150, the program raises the B clock line. The program then descends into decisional block 152 where it checks the state of A clock line. If the A clock line is not high, the program waits until it is high and then descends into block 154 where it drops the B clock. The program then descends into decisional block 156. In decisional block 156, the program tests the status of the A clock line. If the A clock line is not low, the program waits until it is low and then descends into block 158. In block 158, the program checks to see if the bit count is equal to a one. If it is not equal to a one, the program descends into block 160. In block 160, the program continues to receive data bits. If the bit count in block 158 is equal to one, the program descends into block 162. In block 162, the program checks to see if it receives the check bit and descends into block 164. In block 164, the program in the B CPU decrements the bit count and descends into decisional block 166. In decisional block 166, the program checks to see if the bit count is equal to zero. If it is not equal to zero, the program loops back to block 150 and executes the already-described process steps.

If the bit count (block 166) is equal to zero, the program descends into block 168 where it raises the B clock and descends into decisional block 170. In decisional block 170, the program tests the state of the A clock. If the A clock is not high, the program waits or loops until it becomes high and descends into block 172 (FIG. 5D).

In block 172 (FIG. 5D) the program checks parity. If the parity indicates error in the received data, the program descends into block 174 where it sets the data line high and descends into block 176. If the parity is ok (block 172), the program descends into block 178 where it drops the data line and descends into block 176. In block 176, the program drops the B clock and descends into decisional block 178. In decisional block 178, the program tests the A clock. If the A clock is not low, the program loops until it is low and then descends into block 180 where it raises the B clock and descends into block 182. In block 182, the program releases the data line and descends into decisional block 184. In decisional block 184, the program tests the status of the A clock. If the A clock is not high, the program loops until it is made high and then exits the program.

Figure 3A:
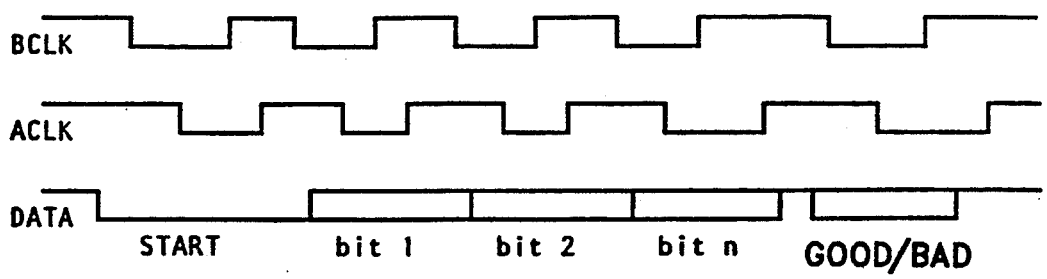
FIGS. 3A, 3B and 3C show graphical representations (timing charts) of the electrical states of the interface lines. The electrical states are helpful in understanding the communications architecture according to the teachings of the present invention.
Figure 3B:
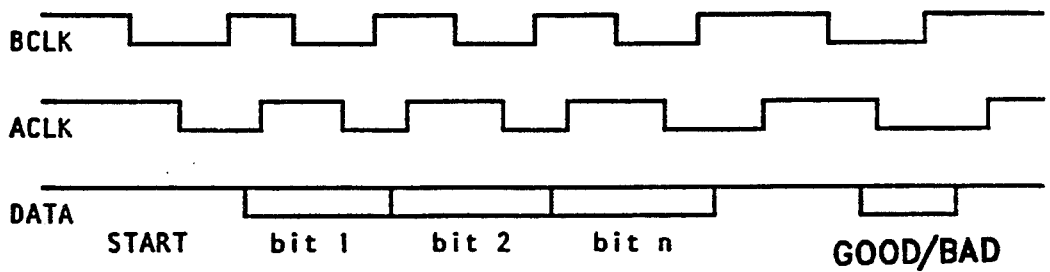
Figure 3C:
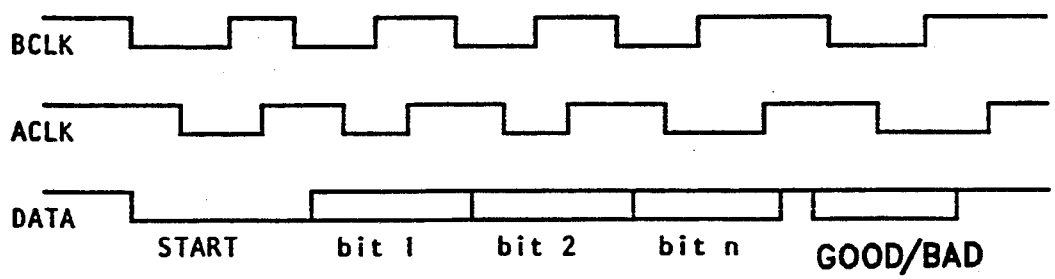

FIGS. 3A, 3B and 3C show timing diagrams which are helpful in understanding the operation of the protocol or architecture on the communications line and simplex clock lines. FIG. 3A shows timing when A is sending data to B. FIG. 3B shows timing when B is sending to A and FIG. 3C shows timing used in resolving contention for the data line.

The contention occurs when both processors attempt to use the data line simultaneously. With reference to the figures (3A, 3B and 3C), when MPA is ready to send, it checks the B clock line to see if MPB is trying to send. If the B clock line is high (B is not trying to send), CPU A lowers the data line. MPB detects the low data line. This is an indication that MI A is ready to send. When CPU B is ready to receive, CPU B lowers the B clock. CPU A then lowers the A clock line indicating the start bit is valid. CPU B raises the B clock acknowledging the receipt of the start bit (0). CPU A raises the A clock and waits for CPU B to request data. CPU B lowers to B clock when it is ready for data. CPU A then places the data bit on the data line and lowers A clock. CPU B receives the data bit and raises B clock. CPU A raises A clock. When CPU B is ready for another bit, CPU B lowers the B clock indicating a request for data. CPU A places the data on the data line and lowers A clock. CPU B receives the data and raises B clock. CPU A raises A clock. This process continues until the last data bit (n) has been received.

After the data has been sent from CPU A to CPU B, the architecture of the present invention provides a means for CPU B to acknowledge receipt of the data. CPU A begins the process by releasing the data line. This is an invitation to CPU B to send a positive acknowledgement. CPU B processes the received data, using a suitable checking method such as parity or CRC. CPU B places good (low) or bad (high) status on the data line and lowers B clock. CPU A receives the data and lowers A clock. CPU B raises B clock and releases the data line. The data transfer sequence ends when CPU A raises A clock. As used herein, good (low) means that, if the data is good, the receiving microprocessor forces the data Line low (i.e., places a near zero signal on the data line). Likewise, if the data is bad, a positive signal is placed on the data line.

It should be noted that if the receiver in B has lost synchronization, CPU A detects this in either of two ways. If CPU B has lost a bit, CPU B will lower B clock asking for another bit. However, the data line will be high indicating a bad reception. If CPU B has received an extra bit, it will never lower B clock to indicate a positive acknowledgement. Either will indicate an error to CPU A.

When sending data from MPB to MPA, the same clock timings are used. However, the signals on the data line are different. CPU B checks the data line to insure that it is high (CPU A is not requesting to send) and lowers B clock. CPU A detects a low B clock and interprets this as a ready to send indication from B. When CPU A is ready to receive, it lowers A clock indicating the receipt of the A bit (a "1"). CPU B checks that the start bit is a "1" and raises B clock. CPU A then raises A clock. CPU B places the first data bit on the data line and lowers B clock. CPU A detects the low B clock and reads the data bit. When the data has been received, CPU A lowers A clock. CPU B raises B clock and A raises A clock. This process continues until the last bit has been sent. CPU B releases the data line and lowers B clock. This is an invitation to CPU A to send a positive acknowledgement. CPU A places the good (low) or bad (high) indication on the data line and lowers A clock. CPU B receives the acknowledgement and raises B clock. CPU A releases the data Line. The data transfer sequence ends when CPU A raises A clock.

It should be noted that if the receiver CPU A lost synchronization, CPU B detects this in either of two ways. If CPU A has lost a bit, CPU A lowers A clock asking For another bit. However, the data line will be high indicating a bad reception. If CPU A has received an extra bit, it will never lower A clock to indicate a positive acknowledgement. Either will indicate an error to B.

Although the invention has been particularly shown and described with reference to a preferred embodiment thereof, it will be understood by those skilled in the art that various changes in form and details may be made therein without departing from the spirit and scope of the invention.

Having thus described my invention, what I claim as new and desire to secure by Letters Patent is:

1. A keyboard interface controller for coupling a multi-key electronic keyboard to a terminal comprising:
   a first microprocessor operatively coupled to scan keys on the multi-key electronic keyboard and to generate a coded signal representative of depressed keys; said first microprocessor further including
   a first bidirectional data port, a first unidirectional signal port and a second unidirectional signal port with each port of said first microprocessor being independent and all ports being operated simultaneously;
   a second microprocessor having a second bidirectional data port, a third unidirectional signal port and a fourth unidirectional signal port with each port of said second microprocessor being independent and all ports being operated simultaneously;
   a transmission data line for transmitting data bidirectionally interconnecting the first bidirectional data port and the second bidirectional data port;
   a first clock line for transmitting control signals unidirectionally interconnecting the first unidirectional signal port and the third unidirectional signal port;
   a second clock line for transmitting control signals unidirectionally interconnecting the second unidirectional signal port and the fourth unidirectional signal port;
   said first clock line and said second clock line being independent of each other and being operated simultaneously;
   a circuit means disposed in each microprocessor; said circuit means operatively tying interprocessor interconnecting lines to predetermined voltage signal levels;
   means disposed in each microprocessor and operatively coupled to each of the clock lines; said means causing a transmitting processor to sample electrical states on the transmission control clock line of receiving processor and if said electrical state is one of a predetermined range of voltage signal levels, transmit data bits on the transmission data line; and
   an interface means for coupling the keyboard interface controller to the terminal; said interface means providing bidirectional data transfer between the keyboard interface controller and the terminal.

2. The improved controller of claim 1 wherein the means causes the receiving microprocessor to energize its transmission control line with a predetermined pattern of pulses indicating that a bit on the data line has been received and indicating readiness to receive another bit.

3. The improved controller of claim 2 wherein the means causes the transmitting microprocessor to energize its transmission control line with a sequence of pulses similar but offset from the predetermined pattern of pulses on the transmission control line of said transmitting microprocessor.

4. The improved controller of claim 1 wherein the circuit means includes a voltage source;
   resistive means connected to the voltage source; and
   a "dot OR" circuit interconnection coupling each line to a transmit path and a receive path within a microprocessor.

5. The improved controller of claim 1 wherein the predetermined voltage signal levels are set to a value of 5 V.

6. The controller of claim 1 further including the multi-key electronic keyboard coupled to said first microprocessor.

7. The controller of claim 1 wherein the interface means includes a serial Input/Output transceiver;
   a communications line for transmitting information bi-directionally interconnecting the transceiver to the first microprocessor; and
   a cable for transmitting data bi-directionally interconnecting the transceiver to the second microprocessor.

8. A method for controlling the transmission of data between a first microprocessor and a second microprocessor used in a keyboard interface comprising the steps of:
   (a) interconnecting the first processor and the second microprocessor with a bidirectional communications link used by either processor to transmit data, a first unidirectional communications link used by the first microprocessor to transmit control signals and a second unidirectional communications link used by the second microprocessor to transmit control signals;
   (b) if the first processor desires to send data to the second microprocessor, said first microprocessor
      (i) testing the unidirectional communications link of said second microprocessor to see if it is set to a first predetermined electrical state,
      (ii) lowering the bidirectional communications link, if said unidirectional communication link of said second microprocessor is set to the first predetermined electrical state;
   (c) on sensing a lowered bidirectional communications link, said second microprocessor lowering its unidirectional communications link to indicate its readiness to receive data;
   (d) on sensing that said second microprocessor lowers its unidirectional communications link, said first microprocessor lowering its unidirectional communications link indicating a valid start bit;
   (e) said second microprocessor then raising its unidirectional communications link lowered in step (c) to indicate receipt of the start bit; and
   (f) said second microprocessor raising its unidirectional communications link lowered in step (d) and waits for said second microprocessor to request data.

* * * * *